US010776314B2

(12) United States Patent
Tsai

(10) Patent No.: US 10,776,314 B2
(45) Date of Patent: *Sep. 15, 2020

(54) ELECTRONIC APPARATUS AND METHOD FOR TEMPORARILY STORING DATA THEREOF

(71) Applicant: Acer Incorporated, New Taipei (TW)

(72) Inventor: Ching-Ho Tsai, New Taipei (TW)

(73) Assignee: Acer Incorporated, New Taipei (TW)

( * ) Notice: Subject to any disclaimer, the term of this patent is extended or adjusted under 35 U.S.C. 154(b) by 437 days.

This patent is subject to a terminal disclaimer.

(21) Appl. No.: 15/790,062

(22) Filed: Oct. 23, 2017

(65) Prior Publication Data

US 2018/0046636 A1  Feb. 15, 2018

Related U.S. Application Data

(63) Continuation of application No. 14/735,170, filed on Jun. 10, 2015, now Pat. No. 9,836,468.

(30) Foreign Application Priority Data

Mar. 27, 2015 (TW) .............................. 104109984 A

(51) Int. Cl.
*G06F 16/00* (2019.01)
*G06F 16/11* (2019.01)

(52) U.S. Cl.
CPC .................................. *G06F 16/125* (2019.01)

(58) Field of Classification Search
CPC . G06F 16/125; G06F 16/2365; G06F 16/2393
See application file for complete search history.

(56) References Cited

U.S. PATENT DOCUMENTS

| 5,860,071 | A | * | 1/1999 | Ball | G06F 16/957 707/695 |
| 6,081,665 | A | * | 6/2000 | Nilsen | G06F 9/45504 717/116 |
| 6,961,728 | B2 | * | 11/2005 | Wynblatt | H04L 67/10 |
| 7,349,913 | B2 | * | 3/2008 | Clark | H04L 29/06 |
| 8,200,930 | B2 | | 6/2012 | Hull et al. | |

(Continued)

FOREIGN PATENT DOCUMENTS

| CN | 101535965 | 9/2009 |
| CN | 102193842 | 9/2011 |
| CN | 102546674 | 7/2012 |

*Primary Examiner* — Noosha Arjomandi
(74) *Attorney, Agent, or Firm* — JCIPRNET

(57) ABSTRACT

An electronic apparatus and a method for temporarily storing data thereof, adapted to temporarily store the data downloaded from a remote apparatus, are provided. In the method, an access instruction to the remote apparatus is captured, and accordingly a file requested by the access instruction or metadata of all files and subfolders under a folder requested by the access instruction is downloaded and temporarily stored in a storage unit, in which a usage time of the temporarily stored file is recorded. When a specific condition is met, the usage time of all the temporarily stored files is checked and at least one file that is not accessed for the longest time is deleted accordingly. The folder having the deleted file is checked whether not to include data of any file, and accordingly the metadata of all the files and subfolders under the folder is deleted.

10 Claims, 3 Drawing Sheets

(56) References Cited

U.S. PATENT DOCUMENTS

| | | |
|---|---|---|
| 9,608,931 B2* | 3/2017 | Sharma .................. H04L 47/70 |
| 9,792,298 B1* | 10/2017 | Taylor ................. G06F 11/2089 |
| 2002/0143755 A1* | 10/2002 | Wynblatt ............ G06F 16/2471 |
| 2005/0044108 A1* | 2/2005 | Shah ....................... G06F 16/10 |
| 2005/0049993 A1* | 3/2005 | Nori ...................... G06F 16/284 |
| 2005/0050054 A1* | 3/2005 | Clark ...................... G06F 16/25 |
| 2005/0055354 A1* | 3/2005 | Thompson ............ G06F 16/284 |
| 2005/0165735 A1* | 7/2005 | Lin ...................... G06F 16/9574 |
| 2005/0223047 A1* | 10/2005 | Shah ................... G06F 16/1787 |
| 2007/0088724 A1* | 4/2007 | Demiroski ............ G06F 16/284 |
| 2016/0043867 A1* | 2/2016 | Bonsignore ......... H04L 63/0442 |
| | | 713/168 |

* cited by examiner

ELECTRONIC APPARATUS AND METHOD FOR TEMPORARILY STORING DATA THEREOF

CROSS-REFERENCE TO RELATED APPLICATION

This application is a continuation application of and claims the priority benefit of U.S. patent application Ser. No. 14/735,170, filed on Jun. 10, 2015, now allowed, which claims the priority benefit of Taiwan application serial no. 104109984, filed on Mar. 27, 2015. The entirety of each of the above-mentioned patent applications is hereby incorporated by reference herein and made a part of this specification.

BACKGROUND

Field of the Invention

The invention relates to a method and an apparatus for data processing and more particularly, to an electronic apparatus and a method for temporarily storing data thereof.

Description of Related Art

With the development of cloud drives, users have become more and more accustomed to storing documents in the cloud drives. However, a speed of accessing the files through a network unavoidably cannot compare with a speed of accessing the local files. In order to resolve the issue, most cloud drive solutions that are currently available in the market provide a local cache mechanism. In this mechanism, files are pre-downloaded from a cloud drive to a local hard disk to provide a better accessing speed.

For instance, in Dropbox service provided by Dropbox Inc., all files are downloaded from a cloud drive to storage spaces of a local machine, which would occupy all available spaces when the local storage spaces are limited. On the other hand, in Google Drive service launched by Google Inc., all files are downloaded from a cloud drive to storage spaces of a local machine so that a user can choose not to synchronize part of the files. However, this design leads to two issues: (1) most users may not be aware of this setting; (2) the files that are chosen not to synchronize cannot be accessed on the apparatuses.

Moreover, in OneDrive service provided by Microsoft Corporation, a copy of metadata is downloaded for all files from a cloud drive to storage spaces of a local machine, instead of downloading complete copies of all files. The metadata is sufficient for the users to browse, and only when a user's demand for the content of a specific file is confirmed, the file content is downloaded. However, even though spaces for storing the metadata are smaller spaces for storing actual files, the storage spaces are still occupied when the amount of the files is too large. The design does not provide a clearing mechanism after the file content is downloaded. Therefore, with the increase of a usage time of the apparatus, the storage spaces are continuously occupied. When hardware venders continuously reduce storage spaces on apparatuses for saving cost, this storage mechanism is no longer feasible.

SUMMARY

Accordingly, the invention provides an electronic apparatus and a method for temporarily storing data thereof, through which files and metadata temporarily stored in the electronic apparatus are adaptively cleared and thus saving storage spaces occupied by the temporarily stored data.

According to an embodiment of the invention, a method for temporarily storing data, adapted for an electronic apparatus to temporarily store data downloaded from a remote apparatus, is provided. In the method, an access instruction to the remote apparatus is captured, and a file requested by the access instruction or metadata of all files and subfolders under a folder requested by the access instruction is accordingly downloaded from the remote apparatus. Then, the downloaded file or metadata is temporarily stored in a storage unit of the electronic apparatus, and a usage time of the temporarily stored file is recorded. Under a preset condition, the usage time of all the temporarily stored files is checked, at least one file having the longest usage time from a current time is accordingly deleted, whether the folder under which each of the detected files is located does not contain any file having the temporarily stored data is checked and the metadata of all the files and all the subfolders under the folder is accordingly deleted.

According to another embodiment of the invention, an electronic apparatus including a communication unit, a storage unit and a processing unit is provided. The communication unit is connected to a remote apparatus through network connection to download data. The storage unit is configured to temporarily store the data downloaded from the remote apparatus by the communication unit and store modules. The processing unit is coupled to the communication unit and the storage unit and configured to access and execute the modules in the storage unit. The modules include an instruction capturing module, a data downloading module and a data deleting module. The instruction capturing module captures an access instruction to the remote apparatus. The data downloading module downloads a file requested by the access instruction or metadata of all files and subfolders under a folder requested by the access instruction from the remote apparatus through the communication unit, temporarily stores the downloaded file or metadata in the storage unit and records a usage time of the temporarily stored file. The data deleting module checks, under a preset condition, the usage time of all temporarily stored files, accordingly deletes at least one file having the longest usage time from the current time, and checking whether the folder under which each of the detected files is located does not contain any file having the temporarily stored data and accordingly deletes the metadata of all the files and all the subfolders under the folder.

To sum up, the electronic apparatus of the invention captures the access instruction of a user to the electronic apparatus from a user from the remote apparatus and accordingly, accesses the data temporarily stored in a local end or downloads the desired data from the remote apparatus. For the folder accessed by the user, the electronic apparatus downloads the metadata of all the files and all the subfolders under the accessed folder from the remote apparatus and periodically clears the files and the folder that the files belong to which are not used for a long time. Thereby, the storage spaces occupied by the data temporarily stored in the electronic apparatus can be saved.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The electronic apparatus of the present invention not only temporarily stores data of file that has been used by a user, but also stores metadata of all files and subfolders under a folder that has been used by the user. In addition, the electronic apparatus also records a file access history of the user and periodically clears the temporarily stored data of the files or the folders that have not been accessed for a long time in a local end. Thereby, limited storage spaces can be efficiently utilized for temporarily storing data to achieve balance between space demand and data access efficiency.

Figure 1:
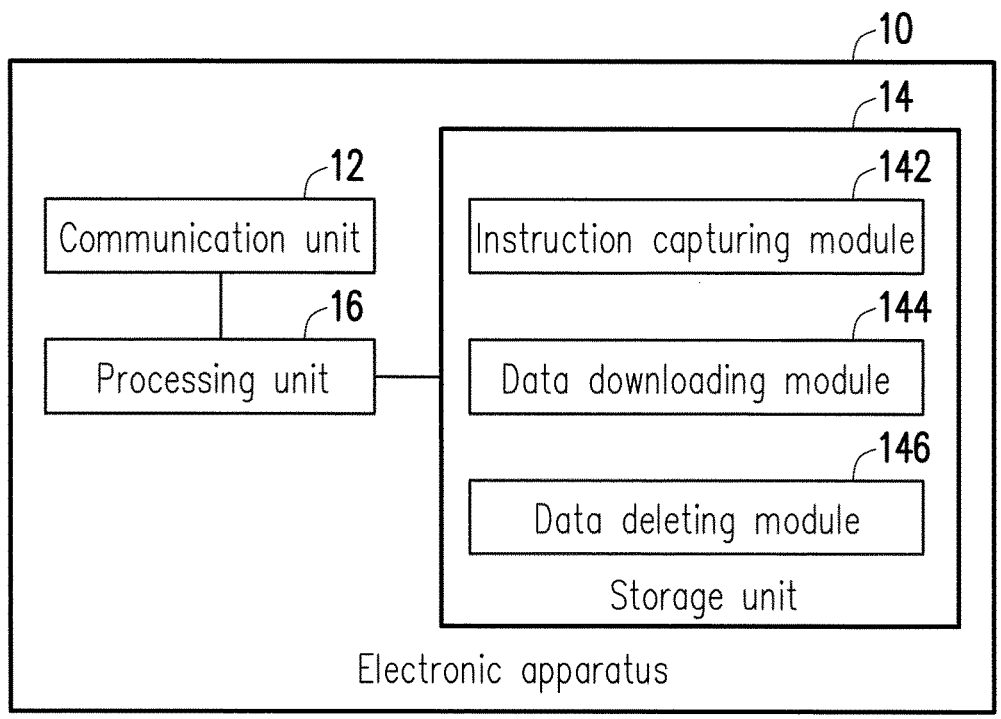
FIG. 1 is a block diagram illustrating an electronic apparatus according to an embodiment of the invention.

FIG. 1 is a block diagram illustrating an electronic apparatus according to an embodiment of the invention. Referring FIG. 1, an electronic apparatus 10 of the present embodiment is, for example, a portable electronic apparatus (e.g., a mobile phone, a smart phone, a personal digital assistance (PDA) or a tablet computer), a notebook computer, or a desktop computer, which is not limited in the invention. The electronic apparatus 10 includes a communication unit 12, a storage unit 14 and a processing unit 16, and functions thereof will be described below.

The communication unit 12 is, for example, a wireless network card complying with a wireless communication standard (e.g., the institute of electrical and electronics engineers (IEEE) standard) or a network card supporting wired network connection and may be connected with an external remote apparatus (not shown) through a network in a wireless or a wired manned. The remote apparatus is, for example, a server or a computer in a remote end, another mobile phone, another smart phone, another PDA or another tablet computer.

The storage unit 14 may be a fixed or a movable random access memory (RAM), read-only memory (ROM), flash memory or a similar component or a combination of those components. In the present exemplary embodiment, the storage unit 14 is configured to temporarily store data downloaded from the remote apparatus by the communication unit 12 and store programs of an instruction capturing module 142, a data downloading module 144 and a data deleting module 146. The storage unit 14 is not limited to a single storage element in the present exemplary embodiment, and each of the software modules may also be separately stored in two or more different storage elements of the same type or of different types.

The processing unit 16 is coupled to the communication unit 12 and the storage unit 14. The processing unit 16 may be a single-core or a multi-core central processing unit (CPU), or any other programmable device for general purpose or special purpose, such as a digital signal processor (DSP), a programmable controller, an application specific integrated circuit (ASIC) or a combination of above-mentioned devices. In the present exemplary embodiment, the processing unit 16 is configured to access and execute the modules recorded in the storage unit 14, so as to implement a method for temporarily storing data of the electronic apparatus 10 of the invention. The processing unit 16 of the present embodiment is not limited to a single processing element and may also include two or more processing elements to commonly execute the modules.

Figure 2:
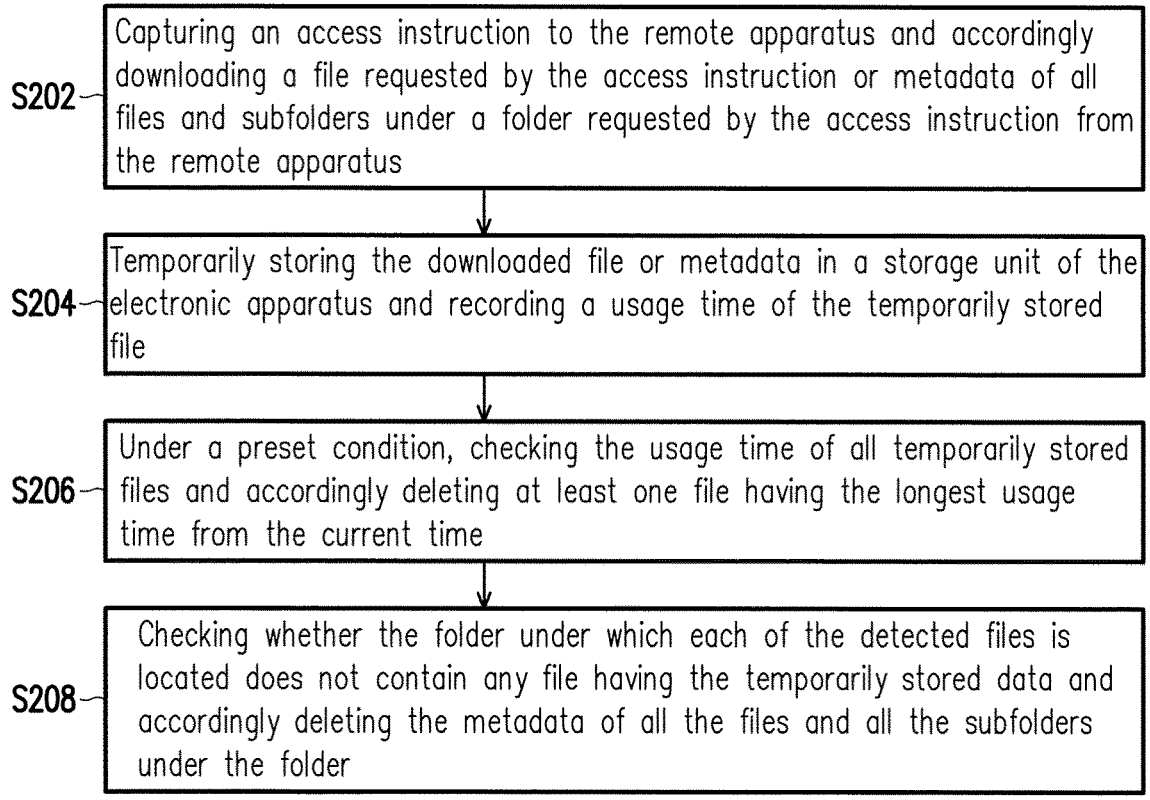
FIG. 2 is a flowchart of a method for temporarily storing data of the electronic apparatus according to an embodiment of the invention.

FIG. 2 is a flowchart of a method for temporarily storing data of the electronic apparatus according to an embodiment of the invention. Referring to FIG. 1 and FIG. 2 simultaneously, the method of the present embodiment is adapted to the electronic apparatus 10, and the detailed process of the method of the present embodiment will be described with reference to each element of the electronic apparatus 10 illustrated in FIG. 1.

First, the instruction capturing module 142 captures an access instruction to a remote apparatus (not shown) from a user of the electronic apparatus 10, and the data downloading module 144 accordingly downloads a file requested by the access instruction or metadata of all files and subfolders under a folder requested by the access instruction from the remote apparatus (step S202). The metadata includes, for example, information for describing properties of data, such as files and folders and may serve as a basis for the electronic apparatus 10 to indicate a storage position, display historic data, search for a resource and record a file. When the user uses the electronic apparatus 10 to browse a file or a folder stored in the remote apparatus through a network, the data downloading module 144 may download metadata of data to be accessed, so as to provide information related to the file or the folder on the remote apparatus to the user, which helps the user to understand the information related to the file or the folder that the user is browsing.

Then, the data downloading module 144 temporarily stores the downloaded file or metadata in the storage unit 14 of the electronic apparatus 10 and records a usage time of the temporarily stored file in the storage unit 14 (step S204). The usage time may serve as historic data of the user using each file and serve as a basis for the electronic apparatus 10 to subsequently clear the files.

It should be mentioned that in the present embodiment, the electronic apparatus 10 temporarily stores the metadata of the file or the folder browsed by the user in the storage unit 14, such that the user may directly access the temporarily stored data when subsequently browsing the same data, thus accelerating the access. With the above temporary storage mechanism, when the instruction capturing module 142 captures the access instruction, the data downloading module 144 first checks whether data to be accessed by the access instruction is temporarily stored in the storage unit 14 so as to determine whether to read the required data directly from the storage unit 14 or to download the required data from the remote apparatus. In the meantime, the data downloading module 14 records the usage time of each file in the storage unit 14 and uses the usage time for subsequent file clearance.

Figure 3:
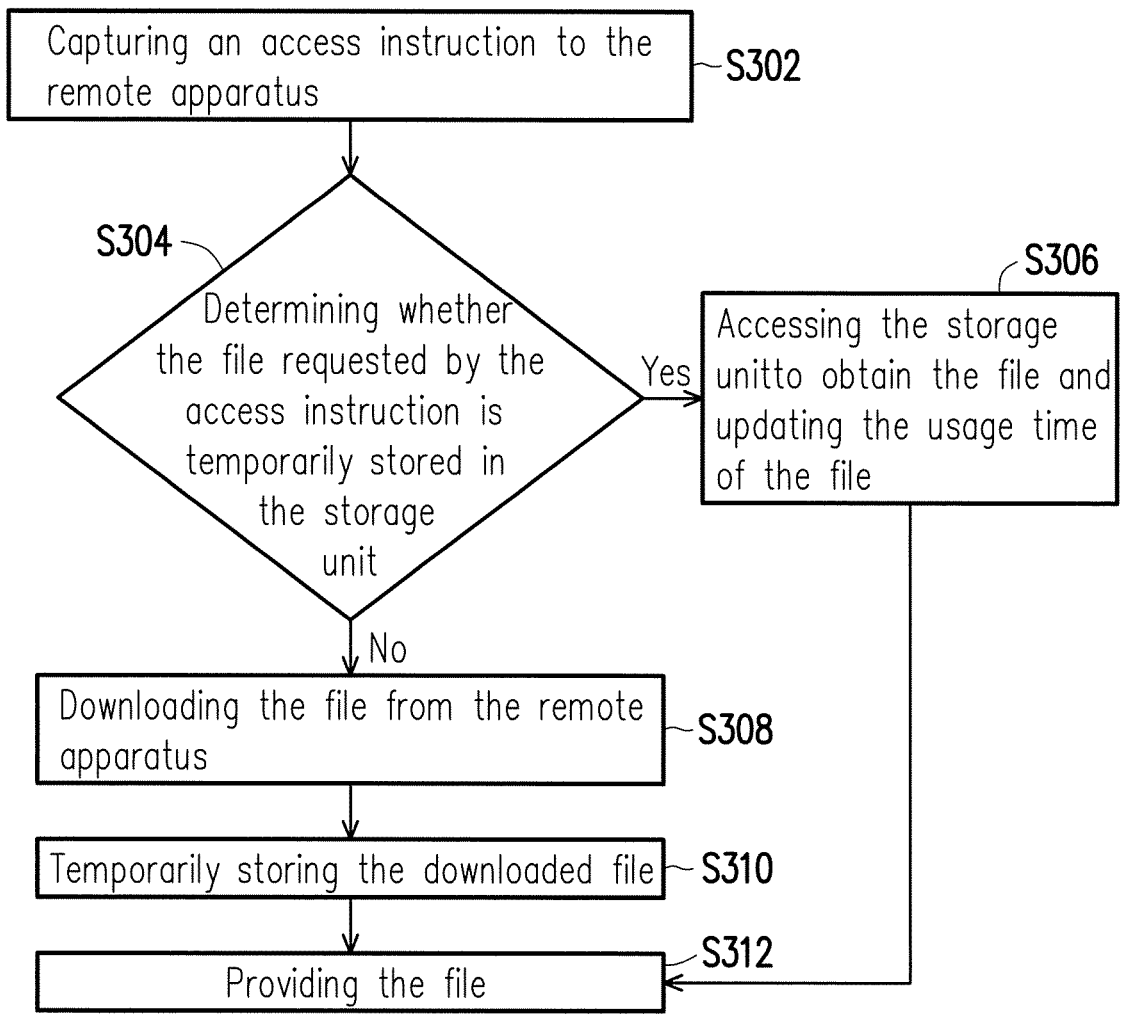
FIG. 3 s a flowchart of a method for temporarily storing data of the electronic apparatus according to an embodiment of the invention.

For instance, FIG. 3 s a flowchart of a method for temporarily storing data of the electronic apparatus according to an embodiment of the invention. Referring to FIG. 1 and FIG. 3 simultaneously, the method of the present embodiment is adapted to the electronic apparatus 10. It is assumed herein that the access instruction captured by the instruction capturing module 142 is to access a file of the remote apparatus, and when the instruction capturing module 142 captures the access instruction (step S302), the data downloading module 144 first determines whether a file requested by the access instruction is temporarily stored in the storage unit 14 (step S304). If recognizing that the file is temporarily stored in the storage unit 14, the data downloading module 144 directly accesses the storage unit 14 to obtain the file and meanwhile, updates a usage time of the file (step S306). Otherwise, if recognizing that the file is not temporarily stored in the storage unit 14, the data downloading module 144 turns to connect to the remote apparatus through the communication unit 12 to download the file from the remote apparatus (step S308) and temporarily stores the downloaded file in the storage unit 14 (step S310). Lastly, the data downloading module 144 may provide the data requested by the access instruction (step S312) through opening a file or displaying a folder, for example. With the method for temporarily storing data of the present embodiment, the electronic apparatus 10 can efficiently utilize the storage unit 14 to improve the data access efficiency.

Figure 4:
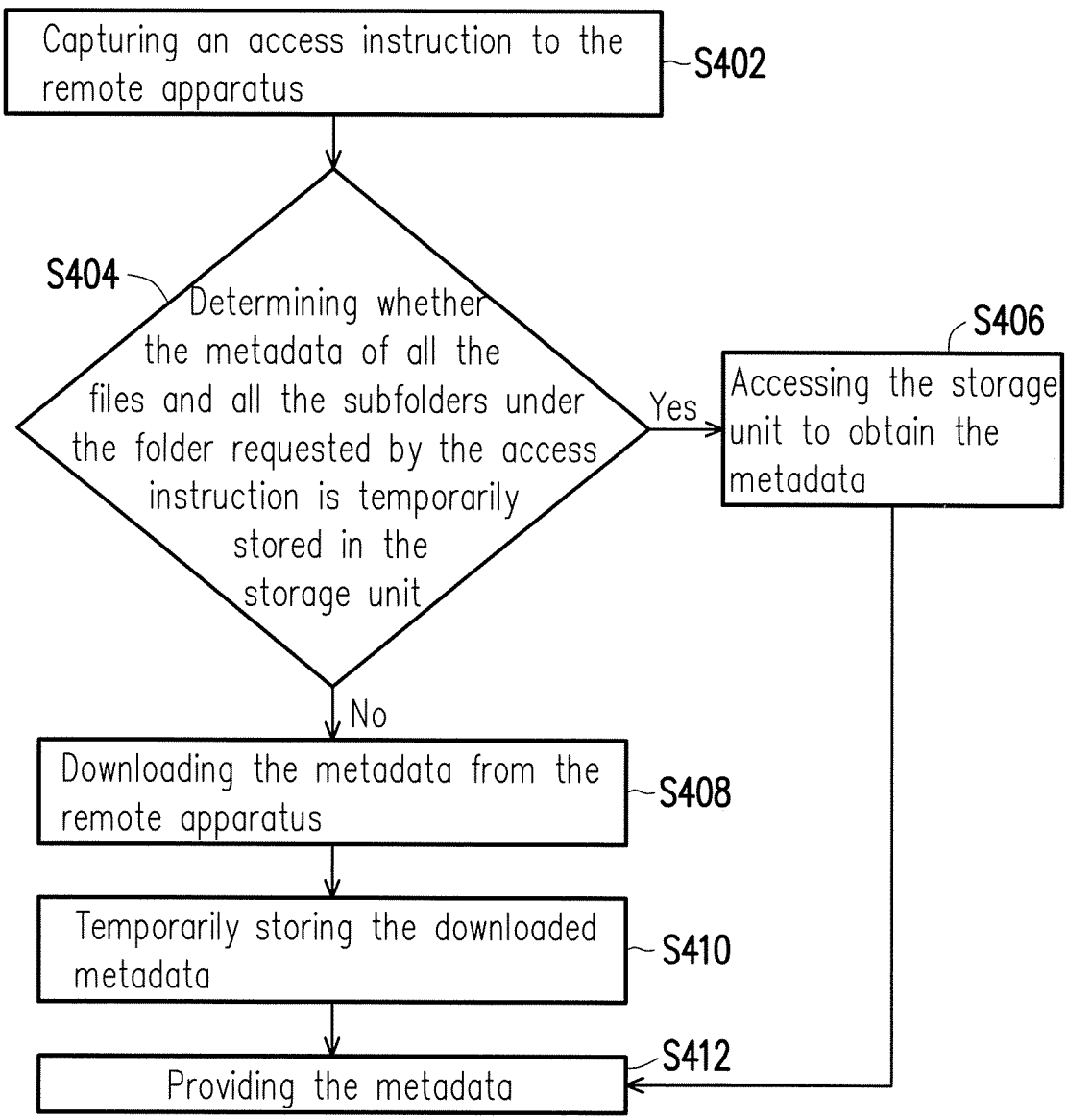
FIG. 4 s a flowchart of a method for temporarily storing data of the electronic apparatus according to an embodiment of the invention.

On the other hand, FIG. 4 is a flowchart of a method for temporarily storing data of the electronic apparatus according to an embodiment of the invention. Referring to FIG. 1 and FIG. 4 simultaneously, the method of the present embodiment is adapted to the electronic apparatus 10. It is assumed herein that the access instruction captured by the instruction capturing module 142 is to access a folder of files, and when the instruction capturing module 142 captures the access instruction (step S402), the data downloading module 144 first determines whether metadata of all files and subfolders under the folder requested by the access instruction is temporarily stored in the storage unit 14 (step S404). If recognizing that the metadata is temporarily stored in the storage unit 14, the data downloading module 144 directly accesses the storage unit 14 to obtain the metadata (step S406). Otherwise, if recognizing that the metadata is not temporarily stored in the storage unit 14, the data downloading module 144 turns to connect to the remote apparatus through the communication unit 12 to download the metadata from the remote apparatus (step S408) and temporarily stores the downloaded metadata in the storage unit 14 (step S410). Lastly, the data downloading module 144 may provide the metadata requested by the access instruction (step S412) through displaying information related to the files or the folder, for example. With the method for temporarily storing data of the present embodiment, the electronic apparatus 10 can efficiently utilize the storage unit 14 to improve the data access efficiency.

Returning to the flow illustrated in FIG. 2, after the data downloading module 144 temporarily stores the downloaded file or metadata in the storage unit 14 of the electronic apparatus 10, under a preset condition, the data deleting module 146 checks the usage times of all the files temporarily stored in the storage unit 14 and accordingly deletes at least one file having the longest usage time from the present (step S206). In detail, in an embodiment, the data deleting module 146 may periodically activate a clearance procedure, for example, per a preset time period (e.g., one week, one month or other times) to automatically clear the data of the files temporarily stored in the storage unit 14 that are not accessed by the user for a long time. In another embodiment, the data deleting module 146 may activate the clearance procedure when a space occupied by the temporarily stored data in the storage unit 14 is over a preset space. The preset condition is illustrated as examples, and technicians of the art may set different conditions for activating the clearance process depending on actual needs, which is not limited in the invention. Additionally, in the preceding step, the data deleting module 146 only deletes the data of the file, but keeps the metadata of the file, such that the user still can browse the information related to the file even offline (i.e., no network is connected).

After deleting the file, the data deleting module 146 further checks whether the folder where each deleted file is located does not contain any file having a temporarily stored data and accordingly, deletes the metadata of all the files and all the subfolders under the folder (step S208). To be detailed, when the user does not access a specific file for a long time, it indicates that an opportunity of accessing the folder where the file is located is also relatively low, and thus, whenever deleting a file having the temporarily stored data, the data deleting module 146 checks whether there are other files having the temporarily stored data in the folder under which the file is located. If the folder does not contain any file having the temporarily stored data, it may be determined that the opportunity of the user subsequently accessing the folder is low, and the metadata of all the files and al the subfolders under the folder is deleted to save the storage space of the storage unit 14.

It should be mentioned that in a folder structure using a tree structure, whenever temporarily stored data of a file is deleted, not only a folder that the file belongs to may contain no file having the temporarily stored data, but also an upper folder of the folder may contain no file having the temporarily stored data. Accordingly, after the step of deleting the metadata of all the files and all the subfolders under the folder, the data deleting module 146 further recursively checks whether an upper folder of the folder does not contain any file having the temporarily stored data and accordingly deletes the metadata of all the files and all the subfolders under the upper folder. The data deleting module 146 continues to check each upper folder layer by layer until reaches an upper folder containing files having the temporarily stored data.

With the method for temporarily storing data, the electronic apparatus of the embodiment of the invention may adaptively delete the metadata of temporarily stored files or folders according to a historic log of the user accessing the files or the folders, such that the storage spaces may be efficiently utilized to enhance data access efficiency.

In view of the foregoing, in the electronic apparatus and the method for temporarily storing data thereof of the invention, the files stored in a cloud drive is downloaded in an on demand manner, such that the electronic apparatus equipped with a small-capacity storage space can also retain the data access efficiency while accessing a large amount of data in the cloud drive. Moreover, in the invention, the temporarily stored file or metadata are periodically cleared according the usage record of the file, such that the storage space of the electronic apparatus can be effectively utilized, so as to achieve balance between the space demand and the data access efficiency.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A method for temporarily storing data, adapted for an electronic apparatus to temporarily store the data downloaded from a remote apparatus, the method comprising:

capturing an access instruction to the remote apparatus, wherein the access instruction requests to access a file or a folder in the remote apparatus;

downloading the file and metadata of the file, or metadata of the folder from the remote apparatus according to requesting of the access instruction;

temporarily storing the downloaded file or the metadata in a storage unit of the electronic apparatus and recording a usage time of the temporarily stored file, wherein the usage time is a time at which the file is temporarily stored in the storage unit;

under a preset condition, checking the usage time of all temporarily stored files in the storage unit and deleting at least one of the temporarily stored files according to the usage time of all temporarily stored files, wherein the time between the usage time of the deleted at least one temporarily stored file and a current time is longer than the time between the usage time of all other temporarily stored files and the current time; and after deleting the at least one temporarily stored file corresponding to the folder, checking whether the folder contains any other file which temporarily stored in the storage unit, and deleting temporarily stored metadata of all the files and all the subfolders under the folder from the storage unit if the folder does not contain any other file which temporarily stored in the storage unit, so as to save space of the storage unit.

2. The method according to claim 1, wherein the step of downloading the file and the metadata of the file, or the metadata of the folder from the remote apparatus according to the requesting of the access instruction comprises:

downloading the file from the remote apparatus if the access instruction requests to access the file in the remote apparatus, wherein the step of downloading the file from the remote apparatus comprises:

determining whether the file is temporarily stored in the storage unit when the access instruction is captured;

accessing the storage unit to obtain the file and updating the usage time of the file if the file is temporarily stored in the storage unit; and downloading the file from the remote apparatus if the file is not temporarily stored in the storage unit.

3. The method according to claim 1, wherein the step of downloading the file and the metadata of the file, or the metadata of the folder from the remote apparatus according to the requesting of the access instruction comprises:

downloading metadata corresponding to the folder from the remote apparatus if the access instruction requests to access the folder in the remote apparatus, wherein the step of downloading the metadata corresponding to the folder from the remote apparatus comprises:

determining whether the metadata of all files and all subfolders under the folder requested by the access instruction is temporarily stored in the storage unit when the access instruction is captured;

accessing the storage unit to obtain the metadata if the metadata is temporarily stored in the storage unit; and downloading the metadata from the remote apparatus if the metadata is not temporarily stored in the storage unit.

4. The method according to claim 1, wherein after the step of deleting the metadata of all the files and all the subfolders under the folder, the method further comprises:

recursively checking whether an upper folder of the folder does not contain any file having the temporarily stored data and accordingly deleting the metadata of all the files and all the subfolders under the upper folder.

5. The method according to claim 1, wherein the preset condition comprises after a preset time period, or when a remaining space in the storage unit is smaller than a preset space.

6. An electronic apparatus, comprising:

a communication unit, configured to connect with a remote apparatus to download data through a network;

a storage unit, configured to temporarily store the data downloaded from the remote apparatus by the communication unit and store at least one module; and a processor, coupled to the communication unit and the storage unit, and configured to access and execute the at least one module in the storage unit to function as:

an instruction capturing module, configured to capture an access instruction to the remote apparatus, wherein the access instruction requests to access a file or a folder in the remote apparatus;

a data downloading module, configured to download the file and metadata of the file, or metadata of the folder from the remote apparatus through the communication unit according to requesting of the access instruction, temporarily store the downloaded file or metadata in the storage unit, and record a usage time of the temporarily stored file, wherein the usage time is a time at which the file is temporarily stored in the storage unit; and a data deleting module, configured to check, under a preset condition, the usage time of all temporarily stored files in the storage unit, and delete at least one of the temporarily stored files according to the usage time of all temporarily stored files, wherein the time between the usage time of the deleted at least one temporarily stored file and a current time is longer than the time between the usage time of all other temporarily stored files and the current time, wherein the data deleting module is further configured to, after deleting the at least one temporarily stored file corresponding to the folder, check whether the folder contains any other file which temporarily stored in the storage unit, and delete temporarily stored metadata of all the files and all the subfolders under the folder from the storage unit if the folder does not contain any other file which temporarily stored in the storage unit, so as to save space of the storage unit.

7. The electronic apparatus according to claim 6, wherein the data downloading module downloads the file from the remote apparatus if the access instruction requests to access the file in the remote apparatus, wherein the data downloading module determines whether the file is temporarily stored in the storage unit when the access instruction is captured, accesses the storage unit to obtain the file and updating the usage time of the file if the file is temporarily stored in the storage unit, and downloads the file from the remote apparatus if the file is not temporarily stored in the storage unit.

8. The electronic apparatus according to claim 6, wherein the data downloading module downloads metadata corresponding to the folder from the remote apparatus if the access instruction requests to access the folder in the remote apparatus, wherein the data downloading module determines whether the metadata of all files and all subfolders under the folder requested by the access instruction is temporarily stored in the storage unit when the access instruction is captured, accesses the storage unit to obtain the metadata if the metadata is temporarily stored in the storage unit, and downloads the metadata from the remote apparatus if the metadata is not temporarily stored in the storage unit.

9. The electronic apparatus according to claim 6, wherein after deleting the metadata of all the files and all the subfolders under the folder, the data deleting module further checks whether an upper folder of the folder does not contain any file having the temporarily stored data and accordingly deletes the metadata of all the files and all the subfolders under the upper folder.

10. The electronic apparatus according to claim 6, wherein the preset condition comprises after a preset time period, or when a remaining space in the storage unit is smaller than a preset space.

* * * * *